March 3, 1942. W. A. O'BANNON 2,274,968
BLIND CAGE VALVE
Filed July 21, 1941
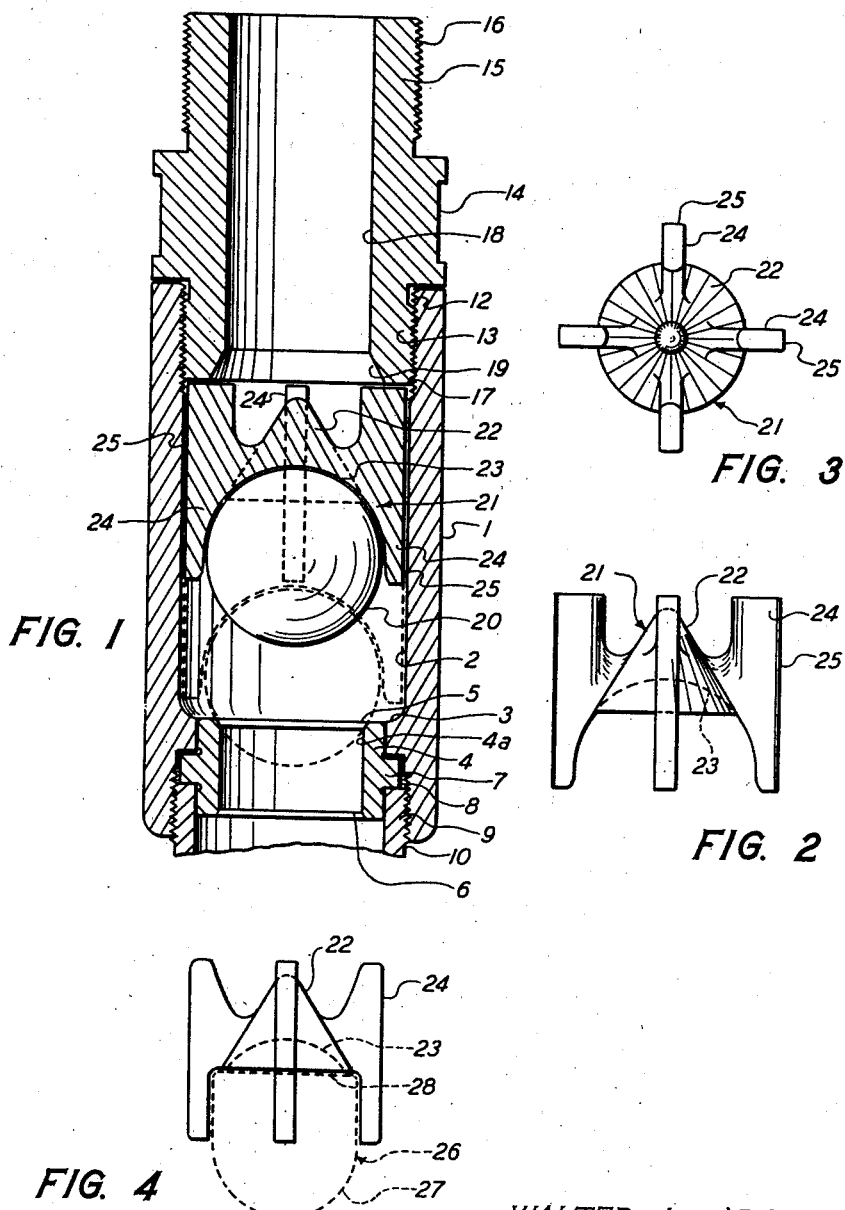
WALTER A. O'BANNON
INVENTOR.
BY [signature]
ATTORNEYS.

Patented Mar. 3, 1942

2,274,968

UNITED STATES PATENT OFFICE 2,274,968

BLIND CAGE VALVE

Walter A. O'Bannon, Tulsa, Okla., assignor to Walter O'Bannon Company, Tulsa, Okla., a corporation of Oklahoma Application July 21, 1941, Serial No. 403,307

4 Claims. (Cl. 251—121)

This invention relates to valves of the ball-and-seat type, and particularly to the type of valve known as a "blind cage" valve, which is adapted for use in pumping strings employed in deep wells such as oil wells and the like.

It is a principal object of this invention to provide a blind cage valve of the class described having novel features of construction and arrangement of the parts such that normal wear and tear on the parts will be greatly reduced and their useful life correspondingly increased.

An additional object is the provision in a valve of the class described of working parts which are removable from the cage or housing elements and may be easily and cheaply replaced when worn.

Another object is to provide a blind cage valve of the ball-and-seat or drop-and-seat type wherein the cage has a smooth internal bore in which is slidably mounted a ball guide member which moves longitudinally with the ball and is constructed so as to produce smooth streamlined flow of the pumped fluid through the valve, to thereby greatly reduce the wear normally encountered in valves of this type upon the ball, seat and guide members.

Other important objects and advantages of the invention will become apparent from the following detailed description when read in conjunction with the accompanying drawing which illustrates one embodiment of a blind cage valve constructed in accordance with this invention, and a modification thereof. It will be understood, however, that the invention is not to be limited to any particular form of the details of the device, but that various changes may be made in details within the scope of the appended claims, without departing from the spirit of this invention.

In the drawing:

Fig. 1 is a longitudinal sectional view of a blind cage valve constructed in accordance with one embodiment of this invention and, as illustrated, showing the valve in the fully open position.

Fig. 2 is an elevational view of the ball guide element of the valve of Fig. 1.

Fig. 3 is a plan view of the guide element of Fig. 2, and

Fig. 4 is an elevational view of a modification of the guide element adapted particularly for use with drop-and-seat type valves.

Referring to the drawing, in which like reference numerals denote the same or equivalent parts in each of the figures, the numeral 1 designates the casing for a blind cage valve in accordance with this invention. Casing 1 has a substantially smooth cylindrical bore 2 extending through the major portion of its length and is provided near its lower end with an internal annular shoulder 3, within the bore of which is seated the usual cylindrical seat member 4, having an axial passageway 4a therethrough. Seat member 4 is of the conventional reversible type, having upper and lower annular seating surfaces 5 and 6 about its upper and lower edges, respectively, and an outwardly extending annular boss 7 about its external midsection. The lower end of casing 1 is threaded internally at 8 for the reception of a conventional seat support member 9, the upper end of which is threaded externally at 10 to engage the threads 8 so as to hold the boss 7 against the lower face of shoulder 3, and thereby firmly support seat member 4 in its proper position within bore 2 of the casing.

The upper end of casing 1 is threaded internally at 12 to receive the externally threaded reduced end portion 13 of a tubular sub 14, or of some other suitable connecting member for connecting the valve into a pumping string in the usual manner. The upper end 15 of sub 14 is also threaded externally at 16, as shown, or may be threaded internally, if desired, for purposes of the aforesaid connection into a pumping string. The annular end surface of the reduced end portion 13 forms an annular shoulder 17 which is adapted to limit the extent of the upward movement of the ball and guide elements of the valve to be described hereinafter. The bore of sub 14 constitutes a discharge passageway 18 for the valve and is downwardly and outwardly tapered adjacent its lower end at 19.

A conventional ball valve 20 is positioned within bore 2 of the casing and is adapted to move vertically therein relative to seating surface 5 in opening and closing the passageway 4a in response to the direction of application of the pressure of the fluid passing through the valve.

A guide member, designated generally by the numeral 21, is slidably mounted in bore 2 above ball valve 20 and is adapted to move vertically within the bore in response to the movements of the ball valve. Guide member 21 comprises an upwardly tapered conical body 22, the base of which is of smaller diameter than that of bore 2, to thereby provide an annular passage between the base of body 21 and bore 2 having an area sufficiently great to permit relatively unobstructed flow through the valve into discharge passageway 18 of the fluid entering the bore 2 through passageway 4a. The lower face of the base of body 22 is hollowed out to form a spherical recess 23 which is adapted to snugly receive the upper portion of ball valve 20. A plurality of longitudinally extending flat guide wings 24 are formed integrally with body 22 and extend radially from the base thereof into close sliding contact with the wall of bore 2. While the embodiment illustrated in the drawing shows four guide wings, a greater or lesser number may be used, and in any case, the wings are equidistantly spaced about the periphery of body 22. Guide wings 24 extend longitudinally both above and below the base of body 22. The internal edge faces of the lower portions of the guide wings are curved outwardly and downwardly along a line of curvature which preferably constitutes a continuation of the curvature of recess 23, and thereby form a plurality of depending fingers surrounding the body of ball valve 20, and prevent lateral displacement of the ball relative to recess 23 and serve also to center the ball valve relative to seating surface 5. The lower ends of wings 24 extend preferably, though not necessarily, below the center of ball valve 20 to enclose as much of the ball surface as possible down to a point which will leave some clearance between the lower ends of the wings and the upper surface of annular shoulder 3, so as not to interfere with the closing of the valve, and so as to avoid any pounding action between the wings and the shoulder 3. The position of the lower ends of wings 24 when the valve is closed is shown in dotted outlines in Fig. 1. The upper ends of wings 24 are adapted to abut against the annular shoulder 17 of end portion 13 of sub 14 and co-act therewith to limit the extent of upward movement of ball valve 20 to the desired degree.

As indicated, the wings 24 are preferably cast or formed integrally with body 22 and the portions connecting the body and wings are preferably rounded, as illustrated particularly in Fig. 2, and these rounded surfaces co-act with the round tapered surface of body 22 to form relatively smooth streamlined fluid passages between the wings and over the outer surfaces of body 22, so that when the valve is open, non-turbulent flow of the pumped fluid will be promoted from inlet passageway 4a to discharge passageway 18, the tapered portion 19 of the latter being of additional assistance in promoting smooth flow of the liquid through the valve. The outer edge faces 25 of the wings which contact bore 2 are preferably rounded to a curvature complementary to that of bore 2 to promote smoothness of operation of the guide member in bore 2 and to prevent undue wear of the contacting surfaces.

With a valve, constructed as described, numerous advantageous features of operation result. The ball valve is maintained accurately centered relative to the seat throughout all its vertical movements and eliminates much of the pounding and peening to which the valve members in more conventional valves are normally subject. As the guide member 21 is removable, it may be readily and cheaply replaced when worn, thus obviating the much greater expense of replacing the more conventional forms of valve cages which are usually provided with integral guide ribs, since wear or corrosion of the latter ordinarily requires replacement of the entire cage. Also, since no internal guide ribs are required in the cage of the present invention, the cost of manufacturing the latter will be greatly reduced.

The novel form of the guide member 21, as described above, promotes smooth streamlined flow of the pumped fluid through the valve, and reduces the turbulence which normally tends to produce a deleterious pounding action of the moving valve parts on the parts of the casing, such as commonly takes place in the more usual forms of valves of the class described. As a result, the valve of this invention is much longer lasting in service and efficient in operation, and the parts subject to greatest wear are relatively cheap to construct and are readily replaceable when worn.

Fig. 4 illustrates a modification of guide member 21, and is adapted particularly for use with conventional "drop" valves. As shown in dotted outlines in Fig. 4, a drop valve, designated generally by the numeral 26, is generally cylindrical in form, one end being spherical, as at 27, for cooperation with the usual annular valve seat such as seat member 4 of Fig. 1, and the other end being flat, as indicated at 28. A guide member which may be employed with such drop valves in a blind cage valve in accordance with this invention, is similar in construction, in substantially all respects, to that previously described, differing only in that the inner edge faces of the lower ends of wings 24 are milled or cut vertically to receive the cylindrical shank 28 of the drop valve into close fitting relationship. The spherical recess 23 is retained, and since the distance between opposite inner faces of the lower ends of the guide wings is substantially equal to the diameter of the ball end of the drop valve, this modified form of guide member may be used successfully with either a drop or ball valve in accordance with this invention.

In the above described valve, it will be evident that the provision of the threaded connection between the upper end of casing 1 and the reduced end portion 13 of the sub will permit longitudinal adjustment of the annular end surface 17 to thereby adjustably limit the extent of upward travel of the ball or drop valves and the guide members.

What I claim and desire to secure by Letters Patent is:

1. A blind cage valve comprising, a tubular outer casing having a relatively smooth internal bore, an annular valve seat positioned in the lower end of said bore and having an axial fluid passageway therethrough, a valve member cooperating with said seat for opening and closing said passageway, a guide member seated on said valve member and slidable in said bore with the longitudinal movements therein of said valve member, said guide member comprising a solid upwardly tapering conical body having a recess in its base portion to receive the upper portion of said valve member, a plurality of wing members integral with the periphery of said base portion and extending radially therefrom into sliding contact with the wall of said bore, said wing members having end portions extending longitudinally of said casing above and below said body, the upper and lower ends of said casing having connecting means for connecting the casing into a pumping string.

2. A blind cage valve comprising, a tubular outer casing having a relatively smooth internal bore, an annular valve seat positioned in the lower end of said bore and having an axial fluid passageway therethrough, a valve member cooperating with said seat for opening and closing said passageway, a guide member seated on said valve member and slidable in said bore with the longitudinal movements therein of said valve member, said guide member comprising a solid upwardly tapering conical body having a recess in its base portion to receive the upper portion of said valve member, a plurality of wing members integral with the periphery of said base portion and extending radially therefrom into sliding contact with the wall of said bore, said wing members having end portions extending longitudinally of said casing above and below said body, the upper and lower ends of said casing having connecting means for connecting said casing into a pumping string, said upper connecting means cooperating with the upper extensions of said wing members to limit the upward travel of said valve and guide members in said bore.

3. A blind cage valve comprising, a tubular outer casing having a relatively smooth internal bore, an annular valve seat positioned in the lower end of said bore and having an axial fluid passageway therethrough, a valve member cooperating with said seat for opening and closing said passageway, a guide member seated on said valve member and slidable in said bore with the longitudinal movements therein of said valve member, said guide member comprising a solid upwardly tapering conical body having a recess in its base portion to receive the upper portion of said valve member, a plurality of wing members integral with the periphery of said base portion and extending radially therefrom into sliding contact with the wall of said bore, said wing members having end portions extending longitudinally of said casing above and below said body, the upper and lower ends of said casing being internally threaded for connecting the casing into a pumping string, said upper connecting means including a tubular sub element having a reduced end portion insertable in said upper end of said casing and being externally threaded for engagement with the threads of said upper end of the casing, the annular end surface of said reduced portion of the sub element being adapted to form stop means for limiting the upward travel of said valve member and guide member in said bore.

4. A blind cage valve comprising, a tubular outer casing having a relatively smooth internal bore, an annular valve seat positioned in the lower end of said bore and having an axial passageway therethrough, a ball valve cooperating with said seat for opening and closing said passageway, a guide member seated on said ball valve and slidable in said bore with the longitudinal movements therein of said ball valve, said guide member comprising a solid upwardly tapering conical body having a spherical recess in its base portion to receive the upper portion of said ball valve, a plurality of wing members integral with the periphery of said base portion and extending radially therefrom into sliding contact with the wall of said bore, said wing members having end portions extending above and below said body, the upper and lower ends of said casing having connecting means for connecting the casing into a pumping string, said connecting means for the upper end of said casing including longitudinally adjustable stop means for adjustably limiting the upward travel of said ball valve and guide member in said bore.

WALTER A. O'BANNON.